United States Patent
Teng

(10) Patent No.: US 10,023,467 B2
(45) Date of Patent: Jul. 17, 2018

(54) METHOD FOR MANUFACTURING A NANOCARBON MATERIAL

(71) Applicant: National Taiwan Normal University, Taipei (TW)

(72) Inventor: Tun-Ping Teng, New Taipei (TW)

(73) Assignee: National Taiwan Normal University, Taipei (TW)

( * ) Notice: Subject to any disclaimer, the term of this patent is extended or adjusted under 35 U.S.C. 154(b) by 0 days.

(21) Appl. No.: 14/947,309

(22) Filed: Nov. 20, 2015

(65) Prior Publication Data

US 2016/0362301 A1    Dec. 15, 2016

(30) Foreign Application Priority Data

Jun. 12, 2015  (TW) .............. 104119121 A

(51) Int. Cl.
| | |
|---|---|
| *C09C 1/54* | (2006.01) |
| *C01B 31/02* | (2006.01) |
| *C01B 32/15* | (2017.01) |
| *C01B 32/18* | (2017.01) |

(52) U.S. Cl.
CPC .......... *C01B 31/0293* (2013.01); *C01B 32/15* (2017.08); *C01B 32/18* (2017.08); *C09C 1/54* (2013.01)

(58) Field of Classification Search
CPC ................ C09C 1/54; C01B 32/15
See application file for complete search history.

(56) References Cited

U.S. PATENT DOCUMENTS

| | | | | |
|---|---|---|---|---|
| 4,452,771 A | * | 6/1984 | Hunt | C09C 1/48 423/449.1 |
| 6,086,841 A | * | 7/2000 | Lee | C09C 1/50 423/449.1 |

\* cited by examiner

*Primary Examiner* — Stuart Hendrickson
(74) *Attorney, Agent, or Firm* — The Webb Law Firm

(57) ABSTRACT

A method for manufacturing a nanocarbon material includes the steps of: a) supplying an acetylene-based flammable gas into a torch nozzle at a flow rate such that an ignition at the torch nozzle produces a reducing flame in a cooling zone in a chamber; and b) supplying a cooling medium to a nebulizer disposed upstream of the cooling zone to produce nebulized droplets of the cooling medium such that the nebulized droplets come into contact with the reducing flame in the cooling zone to thereby cause carbon nanoparticles to be entrained in the nebulized droplets.

9 Claims, 6 Drawing Sheets

METHOD FOR MANUFACTURING A NANOCARBON MATERIAL

CROSS-REFERENCE TO RELATED APPLICATION

This application claims priority to Taiwanese Patent Application No. 104119121 filed Jun. 12, 2015, the disclosure of which is hereby incorporated in its entirety by reference.

FIELD

This disclosure relates to a method for manufacturing a nano material, and more particularly to a method for manufacturing a nanocarbon material.

BACKGROUND

Nanocarbon-based materials, such as nanographites, nanocarbons, carbon nanotubes, and graphene-based materials, have excellent heat-conductive, electrical, and mechanical properties. Therefore, the methods for manufacturing these materials have been widely researched recently.

Generally, nanographites and nanocarbons are manufactured by chemical reaction, mechanical milling, arc heating vaporization, or heating/cooling cracking. Carbon nanotubes are manufactured by a laser ablation process, a chemical vapor deposition process, a solvothermal process, a water-assisted hot-cool treatment, an arc-evaporation process, or other chemical synthesis processes. Graphene-based materials are manufactured by a Hummer method, a chemical vapor deposition process, an electro-exfoliation process, or a mechanical exfoliation process.

However, the aforesaid processes for manufacturing the nanocarbon-based materials are usually performed using expensive equipment or under specified environmental atmospheres. In addition, some of the aforesaid processes require use of a large amount of various chemical agents, which result in waste treatment problems.

There is thus a need in the art to provide a method for manufacturing nanocarbon-based materials, which is relatively low in production cost and environmentally friendly, and which may be popularized.

SUMMARY

Therefore, an object of this disclosure is to provide a method for manufacturing a nanocarbon material which is easy to implement and which is less costly.

A method for manufacturing a nanocarbon material includes the steps of:

a) supplying an acetylene-based flammable gas into a torch nozzle at a flow rate such that an ignition at the torch nozzle produces a reducing flame in a cooling zone in a chamber; and b) supplying a cooling medium to a nebulizer disposed upstream of the cooling zone to produce nebulized droplets of the cooling medium such that the nebulized droplets of the cooling medium come into contact with the reducing flame in the cooling zone to thereby cause carbon nanoparticles to be entrained in the nebulized droplets.

The method for manufacturing a nanocarbon material according to this disclosure may be implemented under a normal atmospheric condition, and thus may be easily implemented and less costly.

BRIEF DESCRIPTION OF THE DRAWINGS

Other features and advantages of this disclosure will become apparent in the following detailed description of the embodiments with reference to the accompanying drawings, of which.

DETAILED DESCRIPTION

Figure 1:
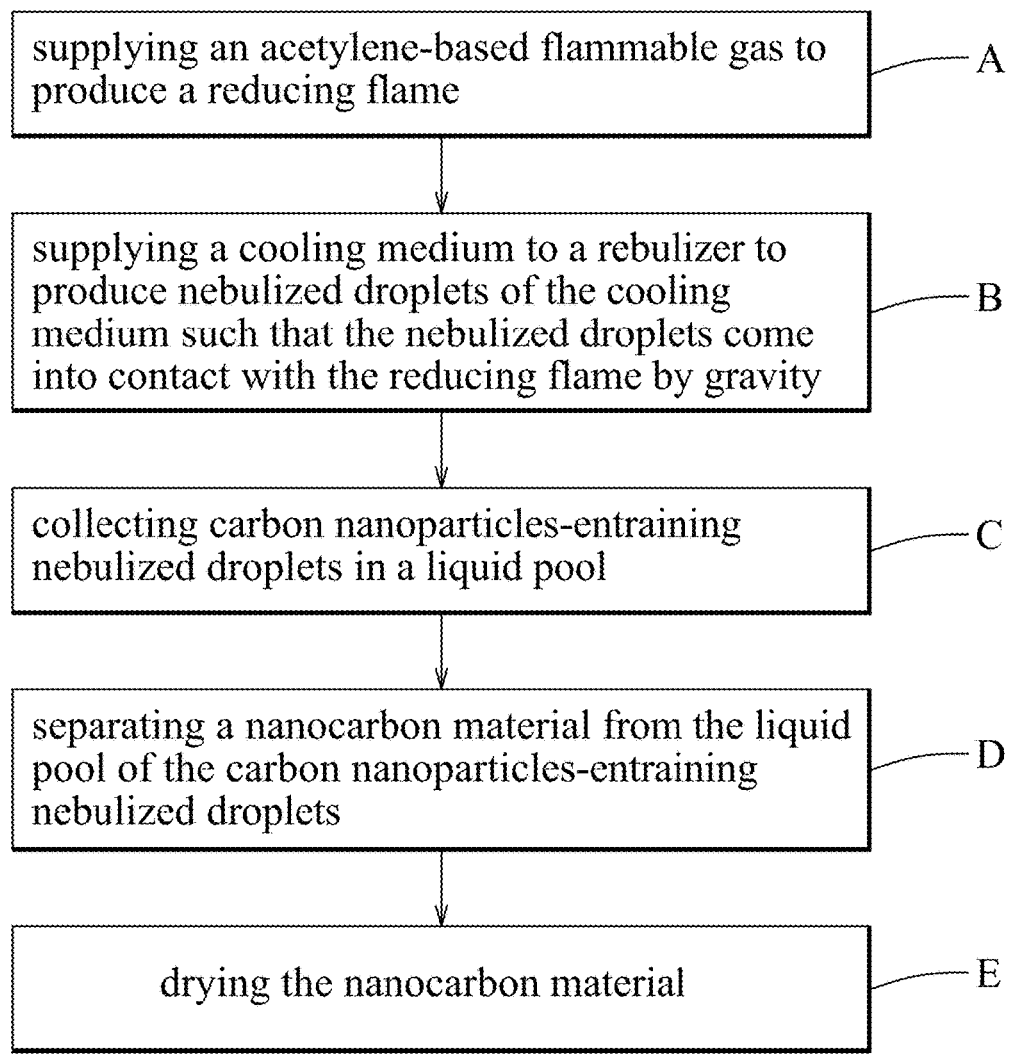
FIG. 1 is a flow chart illustrating a first embodiment of a method for manufacturing a nanocarbon material according to this disclosure.

Before the disclosure is described in greater detail, it should be noted that like elements are denoted by the same reference numerals throughout the disclosure.

Figure 2:
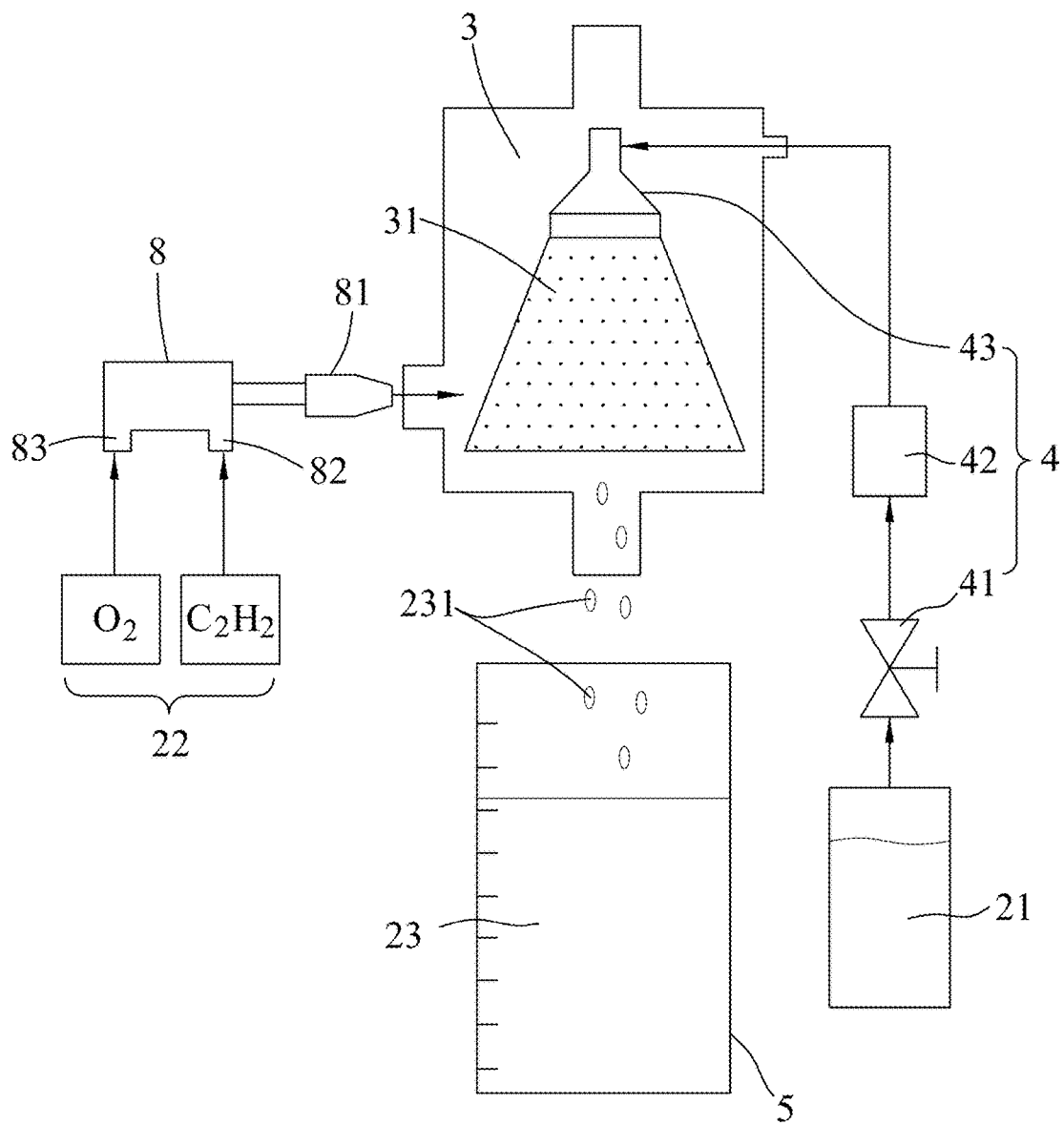
FIG. 2 is a schematic diagram illustrating how the first embodiment is implemented.

With reference to FIGS. 1 and 2, a first embodiment of a method for manufacturing a nanocarbon material according to this disclosure includes the steps of: A) supplying an acetylene-based flammable gas to produce a reducing flame; B) supplying a cooling medium to a nebulizer to produce nebulized droplets of the cooling medium such that the nebulized droplets come into contact with the reducing flame by gravity; C) collecting carbon nanoparticles-entraining nebulized droplets in a liquid pool; D) separating a nanocarbon material from the liquid pool of the carbon nanoparticles-entraining nebulized droplets; and E) drying the nanocarbon material.

In step A), an acetylene-based flammable gas 22 is supplied into a torch nozzle 81 of a burner 8 at a flow rate such that an ignition at the torch nozzle 81 produces a reducing flame in a cooling zone 31 in a chamber 3. The acetylene-based flammable gas 22 includes acetylene and oxygen and is fed by acetylene and oxygen streams supplied through first and second conduits 82, 83, respectively. A flow ratio of the oxygen stream to the acetylene stream may be adjusted according to a geometric form and a composition of the nanocarbon material desired to be manufactured, and is preferably not greater than 0.6.

In step B), a cooling medium 21 is supplied to a nebulizer 43 disposed upstream of the cooling zone 31 to produce nebulized droplets of the cooling medium 21 such that the nebulized droplets of the cooling medium 21 come into contact with the reducing flame in the cooling zone 31 by gravity to thereby cause carbon nanoparticles to be entrained in the nebulized droplets.

Specifically, a nebulizing system 4 is used for performing step B). The nebulizing system 4 includes a control valve 41, a flow meter 42, and the nebulizer 43. The cooling medium 21 flows via the control valve 41 and the flow meter 42 and then to the nebulizer 43 to produce the nebulized droplets of the cooling medium 21. The cooling medium 21 may be any suitable material as long as the material may be nebulized. Examples of materials suitable for use as the cooling medium 21 include water, ethylene glycol, glycerol, lubricant oil, and other non-combustible liquids.

In step C), the carbon nanoparticles-entraining nebulized droplets 231 are collected in a liquid pool in a collector 5 disposed downstream of the cooling zone to obtain a liquid pool 23 of the carbon nanoparticles-entraining nebulized droplets 231.

In step D), the liquid pool 23 is subjected to separation using a separating device (not shown) so as to obtain a nanocarbon material.

In step E), the nanocarbon material is dried using a drying device (not shown) so as to obtain powders or flakes thereof. The drying may include thermal drying, reduced pressure evaporation, spray-drying, etc.

It should be noted that the separating and the drying steps are optional, and the liquid pool 23 of the carbon nanoparticles-entraining nebulized droplets 231 may be used directly as a high thermal conductivity working medium for enhancing heat exchange efficiency.

Figure 3:
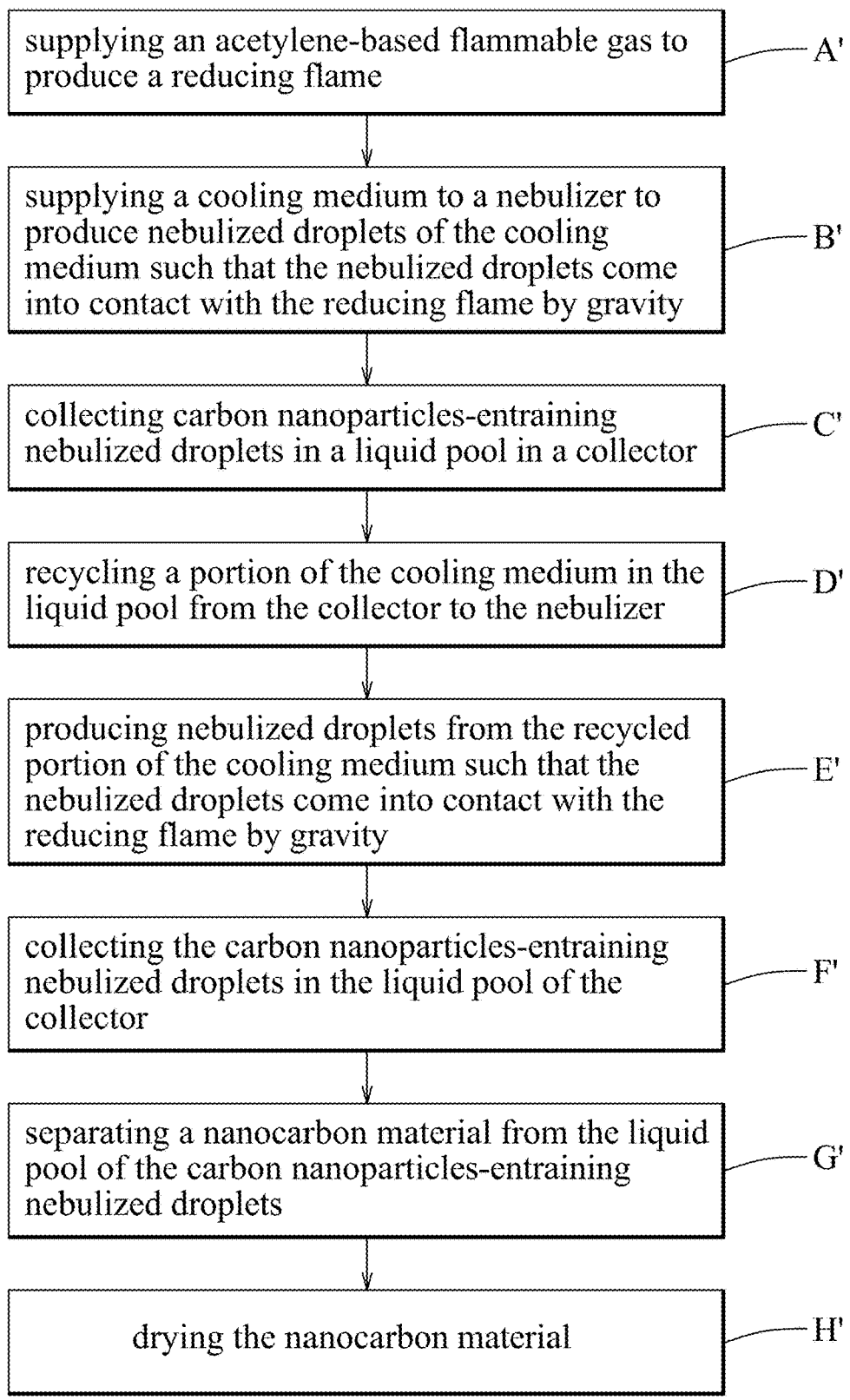
FIG. 3 is a flow chart illustrating a second embodiment of a method for manufacturing a nanocarbon material according to this disclosure.
Figure 4:
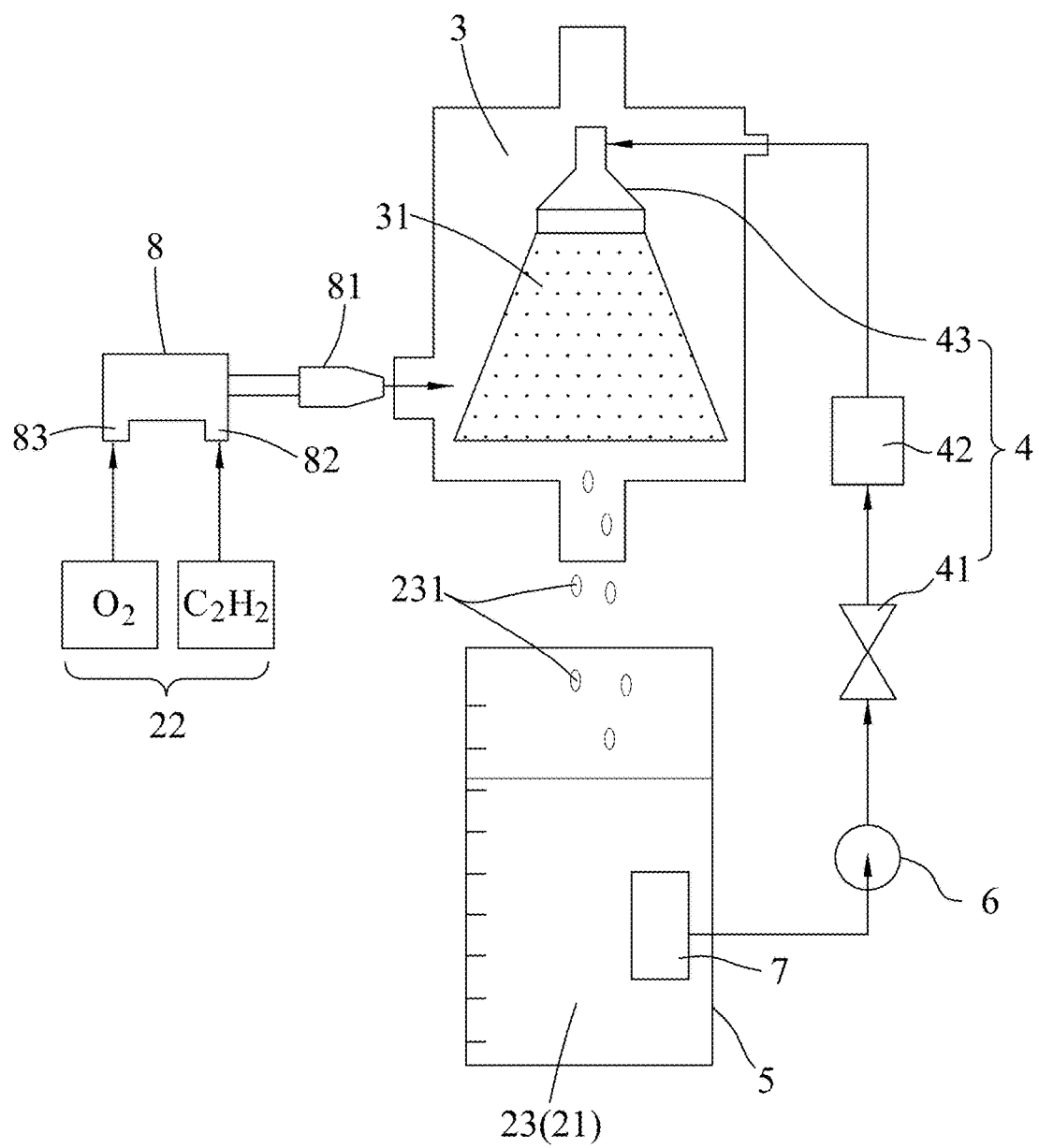
FIG. 4 is a schematic diagram illustrating how the second embodiment is implemented.
Figure 5:
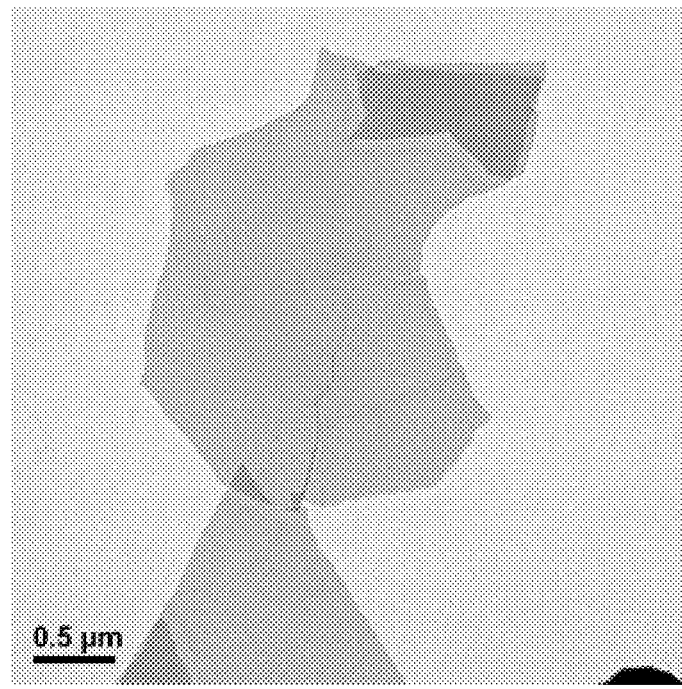
FIGS. 5 to 8 are transmission electron microscopic images of various nanocarbon materials manufactured by the method of this disclosure at various flow ratios of oxygen to acetylene.
Figure 6:
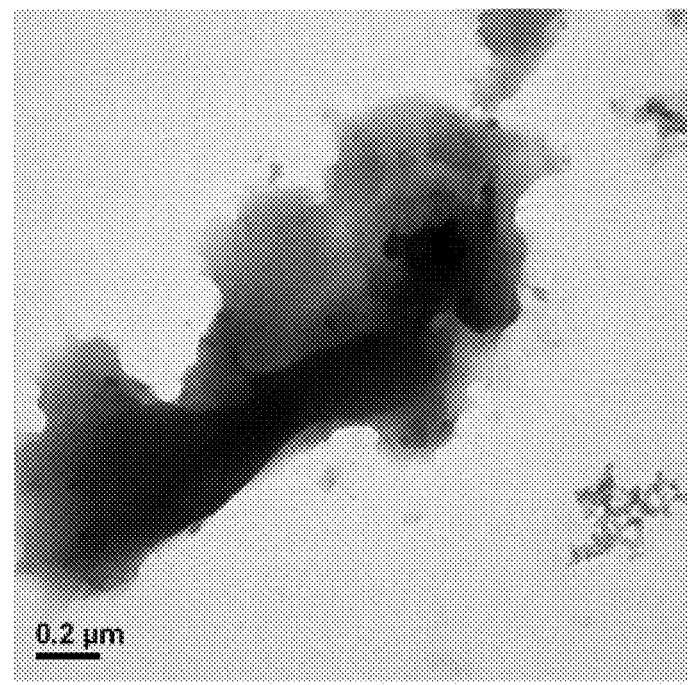
Figure 7:
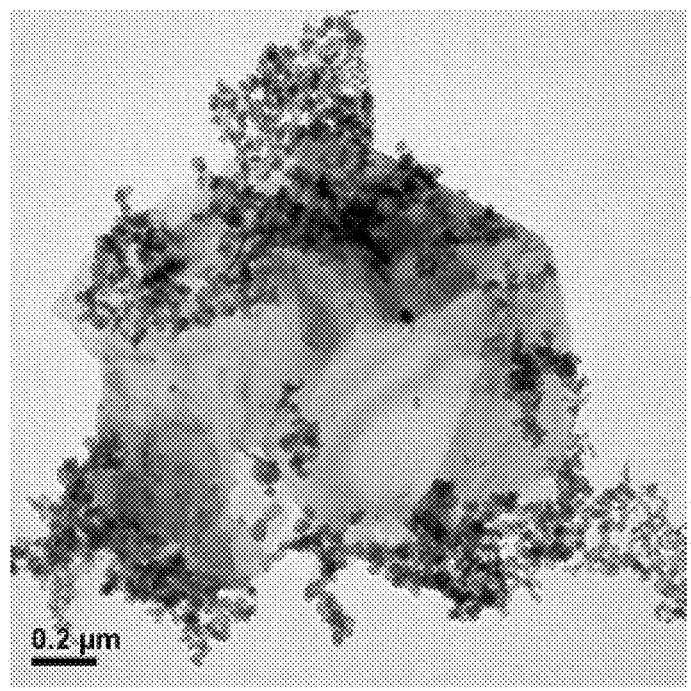
Figure 8:
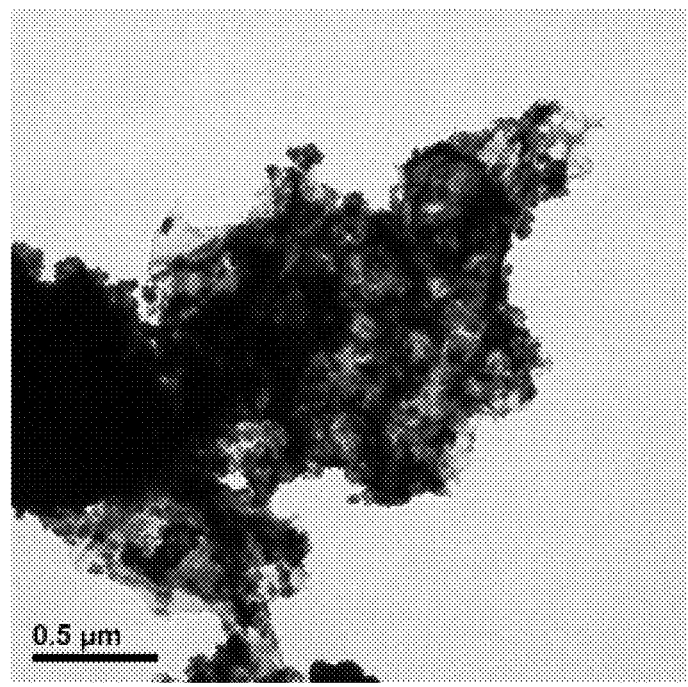

With reference to FIGS. 3 and 4, a second embodiment of a method for manufacturing a nanocarbon material according to this disclosure includes the steps of: A') supplying an acetylene-based flammable gas to produce a reducing flame; B') supplying a cooling medium to a nebulizer to produce nebulized droplets of the cooling medium such that the nebulized droplets come into contact with the reducing flame by gravity; C') collecting carbon nanoparticles-entraining nebulized droplets in a liquid pool in a collector; D') recycling a portion of the cooling medium in the liquid pool from the collector to the nebulizer; E') producing nebulized droplets from the recycled portion of the cooling medium such that the nebulized droplets come into contact with the reducing flame by gravity; F') collecting the carbon nanoparticles-entraining nebulized droplets in the liquidpool of the collector; G') separating a nanocarbon material from the liquid pool of the carbon nanoparticles-entraining nebulized droplets; and H') drying the nanocarbon material.

Steps A'), B') and C') of the second embodiment are performed in the same manners as steps A), B) and C) of the first embodiment, respectively. In the second embodiment, the cooling medium 21 to be supplied to the nebulizer 43 is stored in the collector 5.

In step D'), a portion of the cooling medium 21 in the liquid pool 23 is recycled from the collector 5 to the nebulizer 43 by a pumping device 6 to produce the nebulized droplets.

Steps E'), F'), G') and H') of the second embodiment are performed in the same manners as steps B), C), D) and E) of the first embodiment, respectively.

Steps D'), E') and F') may be repeated one or more times so as to raise the concentration of the nanocarbon material in the liquid pool 23.

Preferably, prior to the recycling step, a portion of the liquid pool 23 in the collector 5 is filtered via a filter 7 to obtain the portion of the cool medium for recycling while leaving the nanocarbon material in the liquid pool 23. Therefore, possible blocking of the nebulizing system 4 by the nanocarbon material may be avoided.

The following examples are provided to illustrate the embodiments of the disclosure, and should not be construed as limiting the scope of the disclosure.

EXAMPLE 1

This example was implemented under a normal atmospheric condition. With further reference to FIG. 2, acetylene and oxygen streams were respectively fed through first and second conduits 82, 83 to supply an acetylene-based flammable gas including acetylene and oxygen. Flow rates of the acetylene and oxygen streams were controlled to be 2.5 L/min and 1.5 L/min, respectively, using mass flow controllers (not shown). The acetylene-based flammable gas was supplied into a torch nozzle 81 of a burner 8. An ignition at the torch nozzle 81 produced a reducing flame in a cooling zone 31 in a chamber 3.

Purified tap water was caused to flow via a control valve 41 and a flow meter 42 to a nebulizer 43 disposed upstream of the cooling zone 31 to produce nebulized droplets of water, which came into contact with the reducing flame in the cooling zone 31 by gravity to thereby cause carbon nanoparticles to be entrained in the nebulized droplets of water.

Carbon nanoparticles-entraining nebulized droplets were collected in a collector 5 to obtain a liquid pool 23 of the carbon nanoparticles-entraining nebulized droplets. The liquid pool was subjected to separation and drying treatments to obtain a nanocarbon material in the form of powders.

EXAMPLES 2-4

The procedure of Example 1 was repeated except that flow rates of the oxygen streams in Examples 2-4 were controlled to be 1.0 L/m, 0.5 L/min, and 0 L/min, respectively.

FIGS. 5 to 8 respectively show the transmission electron microscopic images of nanocarbon materials produced in Examples 1-4. The nanocarbon materials have different geometrical forms, and were obtained by controlling the flow rates of the acetylene and oxygen streams according to the method of this disclosure. When the flow rate of the oxygen stream is relatively increased, the amount of the nanocarbon material in flake form produced is increased. When the flow rate of the oxygen stream is relatively decreased, the amount of the nanocarbon material in powder particle form produced is increased. Specifically, in Examples 1 and 2, the flow rates of the oxygen streams were 1.5 L/min and 1.0 L/min, respectively, and the nanocarbon material produced includes reduced graphene oxide (RGO) and a small amount of nanocarbon powder particles having a particle size ranging from 30 to 50 nm. In Examples 3 and 4, the flow rates of the oxygen streams were 0.5 L/min and 0 L/min, respectively, and the nanocarbon material produced include graphene oxide and a large amount of nanocarbon particles having a particle size ranging from 30 to 50 nm.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for manufacturing a material comprising carbon nanoparticles, the method comprising the steps of:
   a) supplying a cooling medium to a nebulizer to produce nebulized droplets of the cooling medium within a chamber such that the nebulized droplets of the cooling medium define a cooling zone within the chamber; and
   b) supplying an acetylene-based flammable gas into a nozzle at a flow rate such that an ignition at the nozzle produces a reducing flame in the cooling zone of the chamber,
   wherein the nebulized droplets come into contact with the reducing flame to thereby cause carbon nanoparticles to be entrained in the nebulized droplets, and wherein the acetylene-based flammable gas supplied to the nozzle ignites to produce the reducing flame and acts as a carbonaceous feedstock that provides carbon for the formation of the carbon nanoparticles.

2. The method according to claim 1, further comprising, after step b), a step c) of collecting the carbon nanoparticles-entraining nebulized droplets in a collector to obtain a liquid pool of the carbon nanoparticles-entraining nebulized droplets.

3. The method according to claim 2, further comprising, after step c), a step d) of subjecting the liquid pool to separation so as to obtain a nanocarbon material.

4. The method according to claim 3, further comprising, after step d), a step e) of drying the nanocarbon material so as to obtain powders or flakes thereof.

5. The method according to claim 2, further comprising, after step c), a step of recycling a portion of the cooling medium in the liquid pool from the collector to the nebulizer to produce nebulized droplets from the recycled portion of the cooling medium.

6. The method according to claim 5, further comprising, prior to the recycling step, a step of filtering a portion of the liquid pool to obtain the portion of the cooling medium for recycling while leaving the nanocarbon material in the liquid pool.

7. The method according to claim 1, wherein the acetylene-based flammable gas includes acetylene and oxygen and is fed by acetylene and oxygen streams supplied through first and second conduits, respectively.

8. The method according to claim 7, wherein a flow volume ratio of the oxygen stream to the acetylene stream is not greater than 0.6.

9. The method according to claim 1, wherein the cooling medium is selected from the group consisting of water, ethylene glycol, glycerol, and lubricant oil.

* * * * *